(12) United States Patent
Burdon

(10) Patent No.: US 7,541,085 B2
(45) Date of Patent: Jun. 2, 2009

(54) FLEXIBLE CONSTRUCTION ELEMENT WITH LARGE BONDING SURFACE AREA AND METHOD OF MANUFACTURE

(76) Inventor: Robert L. J. Burdon, 3418 Paty Dr., Honolulu, HI (US) 96822

( * ) Notice: Subject to any disclaimer, the term of this patent is extended or adjusted under 35 U.S.C. 154(b) by 495 days.

(21) Appl. No.: 11/160,905

(22) Filed: Jul. 14, 2005

(65) Prior Publication Data
US 2007/0015000 A1    Jan. 18, 2007

(51) Int. Cl.
| B32B 3/12 | (2006.01) |
| B32B 7/00 | (2006.01) |
| B32B 3/00 | (2006.01) |
| B32B 3/02 | (2006.01) |
| B32B 37/00 | (2006.01) |
| H01F 3/00 | (2006.01) |
| B65D 21/00 | (2006.01) |
| B65D 6/00 | (2006.01) |
| B26D 1/14 | (2006.01) |
| B21D 3/00 | (2006.01) |
| B21D 9/01 | (2006.01) |

(52) U.S. Cl. ................ 428/178; 428/116; 428/119; 428/566; 428/71; 428/72; 428/73; 428/76; 264/36.15; 206/501; 72/367.1; 72/369; 83/681; 220/666; 156/60

(58) Field of Classification Search ............... 428/116, 428/172.1, 119; D25/140, 141, 142, 143, D25/144, 152, 153, 162, 163, 102, 110, 114, D25/115, 157, 58; D9/771; D2/958; 229/110
See application file for complete search history.

(56) References Cited

U.S. PATENT DOCUMENTS

| 1,000,694 | A |  | 8/1911 | Schaefer et al. | |
| 1,984,653 | A |  | 12/1934 | Palmer et al. | 154/45 |
| 2,768,924 | A |  | 10/1956 | Wright | 154/124 |
| 3,193,434 | A | * | 7/1965 | Weiss | 428/46 |
| 3,558,394 | A |  | 1/1971 | Hans-Jorg | 156/210 |
| 3,616,154 | A |  | 10/1971 | Dow et al. | 161/113 |
| 3,617,416 | A | * | 11/1971 | Kromrey | 156/173 |
| 3,869,778 | A |  | 3/1975 | Yancey | 29/191 |
| 3,911,187 | A |  | 10/1975 | Raley | 428/180 |
| 4,035,536 | A |  | 7/1977 | Morrison | 428/118 |
| 4,397,902 | A | * | 8/1983 | Resch | 428/119 |
| 4,757,665 | A |  | 7/1988 | Hardigg | 52/782 |

(Continued)

*Primary Examiner*—David R Sample
*Assistant Examiner*—Nicole T Gugliotta
(74) *Attorney, Agent, or Firm*—Seth M. Reiss, AAL, ALLLC

(57) ABSTRACT

A flexible core element having a large bonding surface area suitable for sandwich type construction comprising a plurality of first hexagonal nodes defining a first surface, a plurality of second hexagonal nodes defining a second surface spaced apart from and parallel to the first surface, and a plurality of rectangular wall members which interconnect said first hexagonal nodes to said second hexagonal nodes and define the depth of the core element. Each hexagonal node corresponds to an open hexagonal cell on its obverse surface and serves as a bonding surface. The core element is fabricated from a continuous sheet of material that has been die-cut with a repeating geometrical design, creased and folded, concertina style, in upon itself to make a double-sided core material that is flexible, able to vent, exhibits good bend and shear strength, and has a large surface bonding area rendering it suitable in the construction of lightweight sandwich panels and offering a wide array of other applications.

21 Claims, 7 Drawing Sheets

U.S. PATENT DOCUMENTS

| | | | |
|---|---|---|---|
| 4,906,508 A | 3/1990 | Blankenburg et al. | 428/116 |
| 5,028,474 A | 7/1991 | Czaplicki | 428/178 |
| 5,030,501 A * | 7/1991 | Colvin et al. | 428/178 |
| 5,128,195 A | 7/1992 | Hegedus | 428/174 |
| 5,162,143 A | 11/1992 | Porter et al. | 428/179 |
| 5,205,091 A | 4/1993 | Brown | 52/126.6 |
| 5,242,735 A | 9/1993 | Blankenburg et al. | 428/116 |
| 5,312,511 A | 5/1994 | Fell | 156/469 |
| 5,348,601 A | 9/1994 | Ray | 156/155 |
| 5,393,588 A | 2/1995 | Weddendorf | 428/175 |
| 5,443,884 A | 8/1995 | Lusignea et al. | 428/116 |
| 5,543,199 A | 8/1996 | Fell | 428/116 |
| 5,543,204 A | 8/1996 | Ray | 428/179 |
| 5,603,188 A | 2/1997 | Robbin | 52/81.1 |
| 5,609,942 A | 3/1997 | Ray | 428/182 |
| 5,612,117 A | 3/1997 | Belanger et al. | 428/178 |
| 5,759,361 A | 6/1998 | Bennett et al. | 204/196.33 |
| 5,792,295 A | 8/1998 | Huebner et al. | 156/197 |
| 5,851,326 A | 12/1998 | Custer et al. | 156/89.22 |
| 5,894,045 A | 4/1999 | Desrondiers | 428/178 |
| 5,895,700 A | 4/1999 | Yamada et al. | 428/116 |
| 5,958,551 A | 9/1999 | Garcia-Ochoa | 428/137 |
| 6,085,965 A * | 7/2000 | Schwartz et al. | 228/190 |
| 6,511,257 B1 * | 1/2003 | Seaux et al. | 404/34 |
| 6,726,974 B1 | 4/2004 | Pflug et al. | 428/73 |

* cited by examiner

Fig. 15A — Before Compression

Fig. 15B — Partial Compression

Fig. 15C — Fully Compressed

FLEXIBLE CONSTRUCTION ELEMENT WITH LARGE BONDING SURFACE AREA AND METHOD OF MANUFACTURE

CROSS-REFERENCE TO RELATED APPLICATIONS

This application does not claim the benefit of any related patent application.

FEDERALLY SPONSORED RESEARCH

The invention described herein is not the result of or in any way related to federally sponsored research or development.

FIELD OF THE INVENTION

This invention relates to construction elements for sandwich type construction. More specifically, this invention describes a flexible core element that is ventable and suitable for sandwich construction and a method for producing the same.

DESCRIPTION OF PRIOR ART

A structural sandwich is a layered construction formed by bonding two thin facings to a thick one. The basic design concept is to space strong thin facings, or skins, far enough apart with a thick core to assure the combination will be stiff, to provide a core that is stiff and strong enough to hold the facings flat with an adhesive layer, and to provide a core material of sufficient shearing resistance. The structural sandwich panel is analogous to an I-beam, with the facings carrying compression and tension loads, as do I-beam flanges, and the core material carrying shear loads, as does the I-beam web.

The aerospace industry remains the greatest consumer of composite materials and sandwich construction, whether for civil aircraft, military jets, helicopters, aero-engines or the newer space satellites and launchers. Faster speeds, higher altitudes and higher G forces all put immense demands on aircraft and rocket structures. Standard honeycomb cores employed in sandwich construction make stiff and light sandwich panels used extensively in the aerospace industry.

However the aerospace industry is severely hampered by the problem of delamination of sandwich construction panels, and new solutions to this problem are of great interest to the industry since delamination can lead to expensive, and sometimes catastrophic, failures.

Delamination is caused primarily by the failure of the epoxy adhesives to maintain a bond between the skins and the core due to the minimal small bonding area that the typical honeycomb cores offer. The limited bonding area is further exacerbated by the fact that honeycomb type cores create pockets of trapped air within the closed cells of the core once the skins are adhered. The air pressure experienced at high altitudes is much lower than the trapped air within the cells, resulting in the skin being pushed away from the inner core by the higher air pressure. The ingress of water into already partially delaminated cells freezes at high altitudes into ice particles that expand and force the skin to separate from the core. After many cyclic operations, the skin delaminates. Lightning strikes can cause entrapped moisture to immediately turn to steam, further compromising the integral strength of the sandwich panels.

Currently almost one third of an average aircraft's life cycle cost is spent on inspection and repair. Skin delamination from a honeycomb core can only be detected by the use of slow and costly inspections involving guided wave, ultrasonic wave and lamb wave techniques. The damage typically occurs beneath the second hexagonal node surface of the laminate and is not readily detectable. During repair work, further unbonding of the facings from the core can result from high vapor pressure produced by the heating process used to cure the repair material. Thus, any comparable substitute to a honeycomb core for sandwich construction that eliminates or reduces the moisture retention and unbonding problem is desirable.

In rocketry there is a need for a core material that is lightweight, formable and ventable for use in the fabrication of integral cryogenic fuel tank walls to prevent cryo-pumping. Cryo-pumping is the influx of gas into a closed volume resulting from the vacuum generated when cryogenic temperatures liquefy and condense the gas on the boundaries of that volume. This cryo-pumping will occur when the tank wall face sheets develop leaks and allow the cryogen to permeate into the core. Subsequent warming of the cryogen causes a transition from a liquid to a gas phase and results in a substantial increase in core pressure. Without proper venting of this pressure, the core, face sheets, and bond line must sustain the resultant pressure loads without failure. The most likely initial failure mode due to cryo-pumping is face sheet-to-core debonding (delamination). This failure mode occurred recently in a reusable flight demonstration vehicle.

U.S. Pat. No. 5,348,601 issued to Hemen Ray discloses a low-density sandwich construction with an open core that makes it self-venting. It comprises corrugated strips having planar peaks and second hexagonal nodes, arranged adjacent to and parallel with each other, with the peaks and second hexagonal nodes of adjacent strips being 180 degrees out-of-phase with each other. This creates a plurality of passageways through which moisture can escape. Such a construction has good bending strength in the direction perpendicular to the corrugated strips, but less bending strength in the transverse direction.

U.S. Pat. No. 5,162,143 issued to Porter describes a sandwich construction having a core comprised of a plurality of criss-crossed corrugated strips. The corrugated strips cross at their peaks and second hexagonal nodes. To manufacture the construction, forming protrusions are positioned on a base, and the corrugated strips are placed over the protrusions to form the peaks of the corrugations. One protrusion is required for each peak crossing point. The criss-crossed strips are cured to form the core of the sandwich construction. The forming protrusions are then removed, and face sheets are adhesively bonded to the core. This construction thus does not overcome the face sheet unbonding problem from which most sandwich constructions suffer.

The prior art fails to teach a core design for sandwich construction that allows adequate venting capabilities, a large surface bonding area for attachment of face sheets, and good bend strength in all directions along the core plane.

A primary object of the present invention is to provide a core construction element suitable for sandwich construction that resists delamination and sheet-to-core debonding by providing a large bonding surface area.

A further object of the present invention is to provide a core construction element suitable for sandwich construction that resists delamination and debonding by providing a structure that is ventable and unlikely to trap moisture. It is a further object of the present invention to provide a ventable core construction element that exhibits good bending strength in both traverse directions.

Conventional honeycomb cores are composed of closed cells that are combined to form rigid, inflexible, cores. Panels constructed from such inflexible cores are similarly stiff and inflexible. While stiff cores and panels are appropriate for many applications, other applications call for flexible cores and cores that are formable into a variety of shapes and structures.

It is a further object of the present invention to provide a core construction element suitable for sandwich construction which is ventable, has a large bonding surface area, exhibits good bend and sheer strength, and is flexible such that it can be formed into a variety of shapes and structures.

It is yet a further object of the present invention to provide a core construction element suitable for sandwich construction which is ventable, has a large bonding surface area, exhibits good bend and sheer strength, is flexible and formable yet strong, and can be manufactured inexpensively and efficiently.

SUMMARY OF THE INVENTION

These and other problems are solved by the subject invention, a core element for sandwich type construction made from a continuous sheet or web of flat material. The web of flat material is die-cut to demonstrate a repeating geometrical design comprising hexagonal surface nodes interconnected by rectangular wall members. By employing a series of alternating folds, the flat die-cut sheet is folded, concertina style, in upon itself, along creases formed where the sides of the hexagonal nodes meet the edges of the rectangular wall members, to form a double-surfaced core material.

In its folded configuration, a first set of hexagonal nodes define a first surface, while a second set of identically dimensioned hexagonal nodes define a second surface which is spaced apart from the first surface by the length of the wall members. Each hexagonal node corresponds to an open hexagonal cell on its obverse surface and serves as a bonding surface.

The core element of the subject invention offers a large surface bonding area, is flexible, able to vent and is suitable for use, yet not exclusively, as a core component for lightweight sandwich panels. The element offers the further advantages of exhibiting good bending and shear strength, while being stackable, edge joinable and formable.

These and further objects and advantages of this invention will become apparent from consideration of the drawings and ensuing description.

DETAILED DESCRIPTION OF PREFERRED EMBODIMENTS

Core Construction Element

Figure 1:
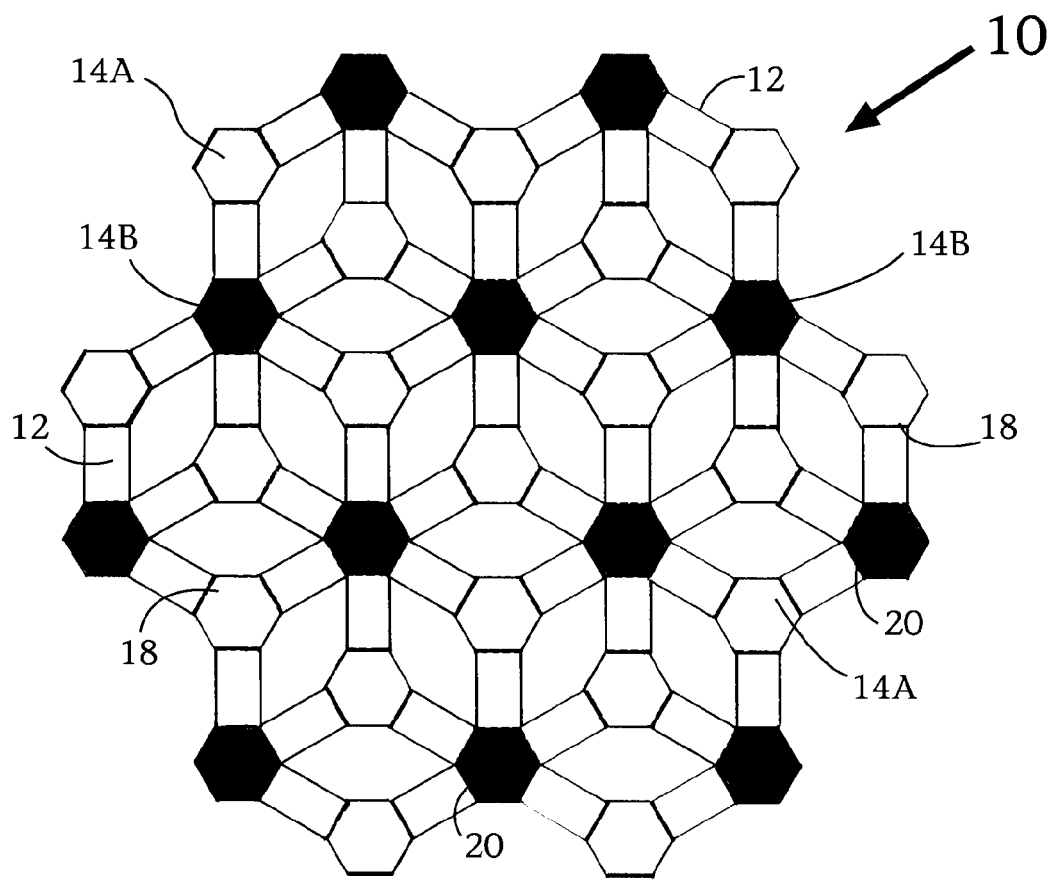
FIG. 1 is a plan view of a section of the flexible core element of the present invention after being die cut and prior to folding.

Illustrated in FIG. 1 is a flat, coplanar sheet of continuous web material that has been die cut to demonstrate the components of a core element 10 of the present invention, prior to folding. Die cut but unfolded construction element 10 comprises a plurality of hexagonal nodes 14A and 14B interconnected by a plurality of rectangular wall members 12.

Nodes 14A that form a first surface of core element 10 are surrounded by six other nodes, three other first surface nodes 14A and three second surface nodes 14B. Nodes 14B that form a second surface of core element 10 are also surrounded by six other nodes, all of which are first surface nodes 14A. Three wall members 12 extend out from every other side of first surface nodes 14A connecting first surface nodes 14A to the three adjacent second surface nodes 14B; while six wall members 12 extend out from every side of second surface nodes 14B connecting second surface nodes 14B to all adjacent first surface nodes 14A. First surface nodes 14A are not interconnected to the three adjacent first surface nodes 14A, only to the three adjacent second surface nodes 14B.

In terms of numerical ratios, there are twice the number of first surface hexagonal nodes 14A compared with the number of second surface hexagonal nodes 14B, and there are six wall members 12 for each second surface hexagonal node 14B.

Each rectangular wall member 12 is preferably a straight flat strip demonstrating a transverse mountain crease 18 at one end and a transverse valley crease 20 at the other end from which the respective hexagonal nodes 14A and 14B extend. Each second surface hexagonal node 14B is a planar hexagon providing six co-planar crease lines 20 about which the respective wall members 12 hinge. Each first hexagonal node 14A is a planar hexagon, identical in size and dimension as second hexagonal node 14B, providing three co-planar crease lines 18 about which the respective wall members 12 hinge.

Wall members 12 and hexagonal nodes 14A and 14B are preferably formed from a continuous co-planar sheet. Wall members 12 are creased and folded where they meet the sides of hexagonal nodes 14A and 14B. The joinder of wall members 12 and first hexagonal nodes 14A are creased from below to create mountain folds 18, whilst the joinder of second hexagonal nodes 14B and wall members 12 are creased from above to create valley folds 20.

Figure 2:
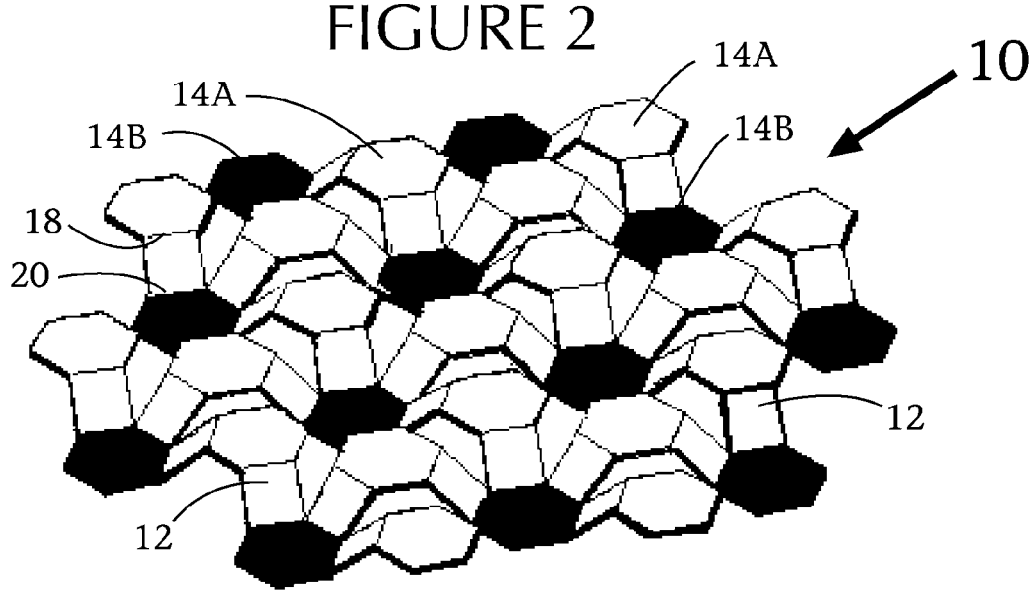
FIG. 2 is a perspective view from the top of the first surface of the core element of the present invention in a partially folded configuration.

Illustrated in FIG. 2 is core element 10 of the present invention partially folded to form a first and second surface. By synchronously folding, concertina style, the first 14A and second 14B hexagonal nodes in opposite directions, the piano-graphic sheet of core element 10 contracts in dimension as wall members 12 are caused to fold about crease line 18 and 20. As can be seen from FIG. 2, first surface hexagonal nodes 14A define a first surface while the second surface hexagonal nodes 14B define a second surface. The first and second surfaces of core 10 are spaced apart by uniformly dimensioned wall members 12, defining the depth of core element 10.

Figure 3:
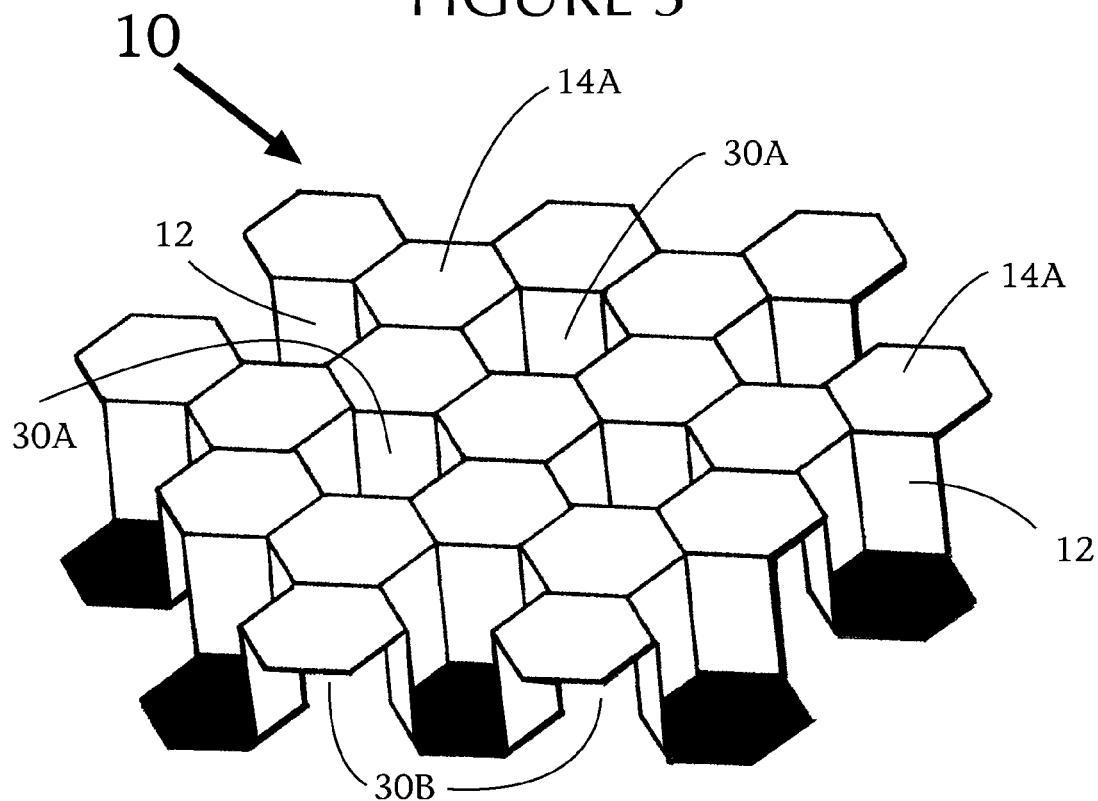
FIG. 3 is a diagrammatic view of the flat, un-flexed core element fully folded, demonstrating a first surface on top.
Figure 4:
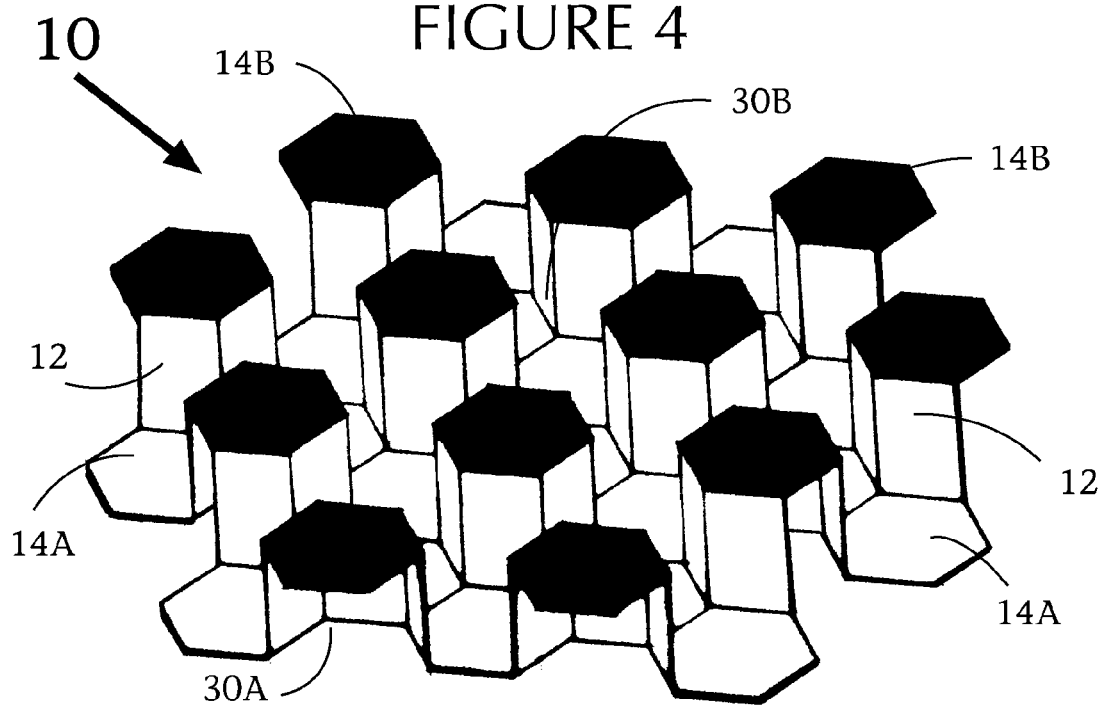
FIG. 4 is a diagrammatic view of the obverse side of the flat, un-flexed core shown in FIG. 3, demonstrating a second surface on top.

FIGS. 3 and 4 show core element 10 of the present invention fully compressed for use in sandwich construction, the first surface of core element 10 depicted on top in FIG. 3 and the second surface of core element 10 depicted on top in FIG. 4. Fully folded, first surface hexagonal nodes 14A are contiguous with adjacent first surface hexagonal nodes 14A, and wall members 12 are contiguous with adjacent wall members 12. Fully folded, hexagonal nodes 14A and 14B and wall units 12 form a plurality of open hexagonal cells 30A, accessible from the first surface, and a plurality of incomplete open hexagonal cells 30B, accessible from the second surface.

Referring first to FIG. 3, every other side of each first surface hexagonal node 14A is contiguous with a side of the three adjacent first surface hexagonal nodes 14A, while each side of each wall members 12 is contiguous with the side of the adjacent wall members 12. The first surface shown on top in FIG. 3 exhibits a pattern comprising six first surface nodes 14A encircling an open hexagonal cell 30A. Each hexagonal cell 30A is formed by a second surface node 14B on core 10's obverse side, and wall members 12. Hexagonal cells 30A are spaced apart, one from the other, by nodes 14A (and cells 30B), and each cell 30A corresponds to a second surface hexagonal nodes 14B.

Referring next to FIG. 4, a plurality of incomplete open hexagonal cells 30B are formed between second surface hexagonal nodes 14B. Each incomplete cell 30B is formed by a first surface node 14A on core 10's obverse side, and wall members 12. Each incomplete hexagonal cell 30B is bordered by three other incomplete hexagonal cells 30B and three wall members 12, and each cell 30B corresponds to a first surface hexagonal node 14A.

Open cells 30A and 30B are responsible for core 10's flexibility and ventability.

One application of core element 10 of the present invention is as a lightweight sandwich panel. According to this application, aluminum alloy face sheets or similar skin material is bonded to each surface of the core element 10 when core element 10 is fully folded as shown in FIGS. 3 and 4, with wall members 12 lying in a direction normal to the first and second surfaces of core element 10. Such an application is useful for panels required to undergo cyclic pressure changes, i.e. for construction of aircraft and rocketry.

Figure 5:
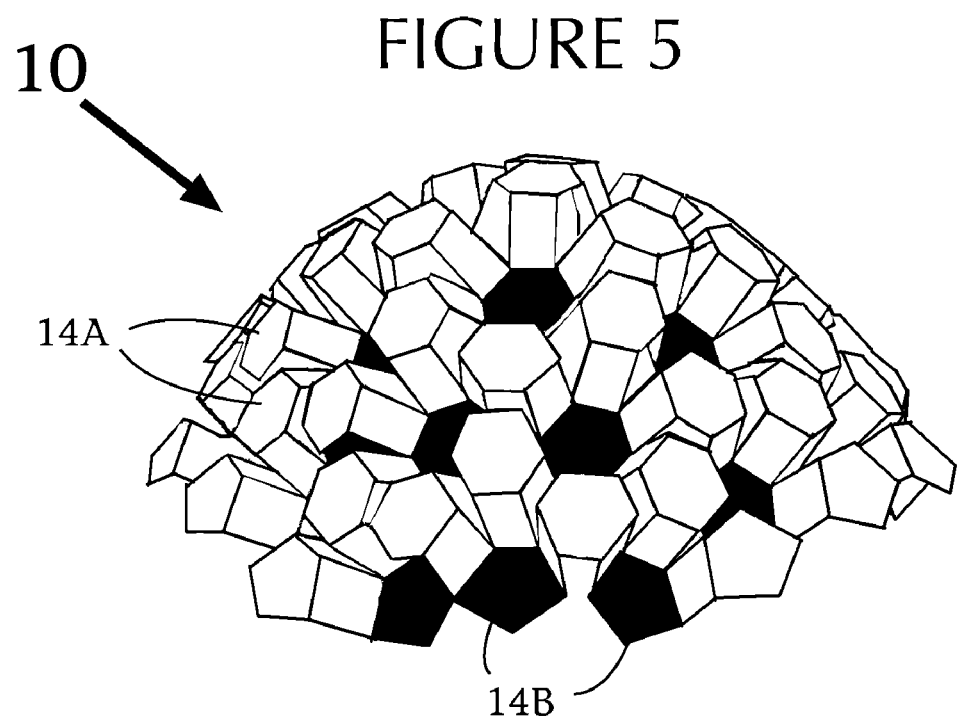
FIG. 5 is a perspective view of the core element flexed into one of many varied aspects of surface curvature according to a further embodiment of the invention.
Figure 6:
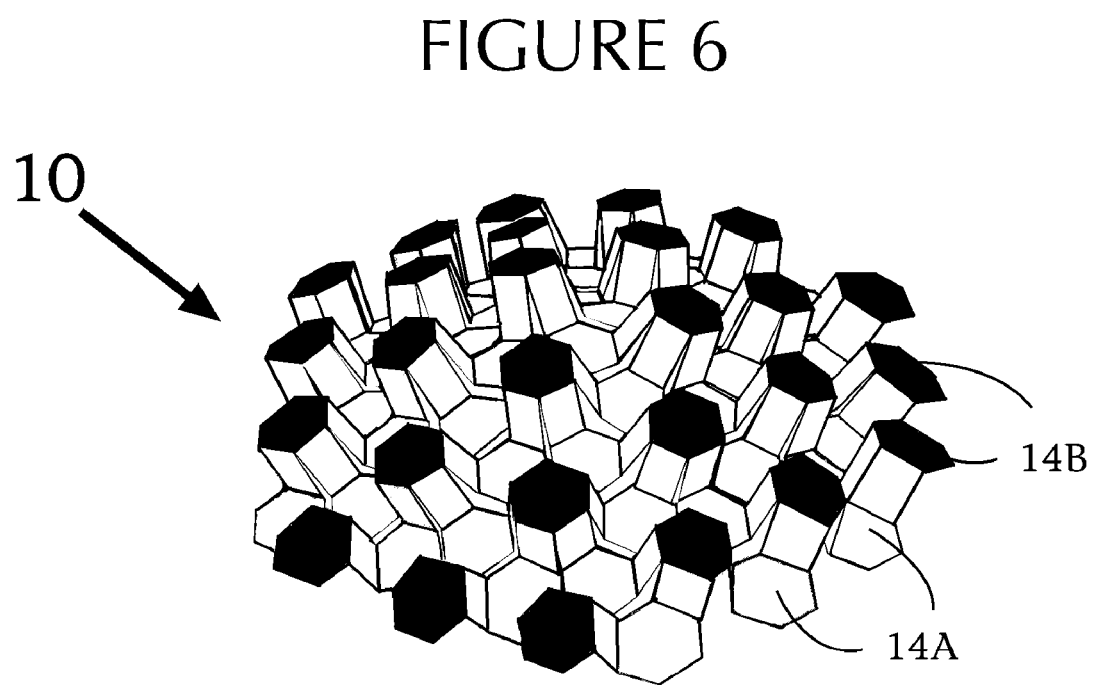
FIG. 6 is a perspective view of the obverse side of the core element shown in FIG. 5, being flexed in the opposite direction.

Depicted in FIGS. 5 and 6 is the core element 10 of the present invention flexed first one way, and then the other, to demonstrate a surface curvature. In FIG. 5, core element 10 has been folded and is flexed such that the first surface formed by hexagonal nodes 14A demonstrates a convex curvature, and the second surface (not shown) formed by hexagonal nodes 14B demonstrates a concave curvature. In FIG. 6, core element 10 has been folded and is flexed in the opposite direction such that second surface formed by hexagonal nodes 14B demonstrates a convex curvature, and the first surface (not shown) formed by hexagonal nodes 14A demonstrates a concave curvature. Core element 10 may be flexed in the manner shown in FIGS. 5 and 6 when used, for example, in architectural panels for cladding, or when forming for use in a variety of multiple surface curvature structures.

Figure 7:
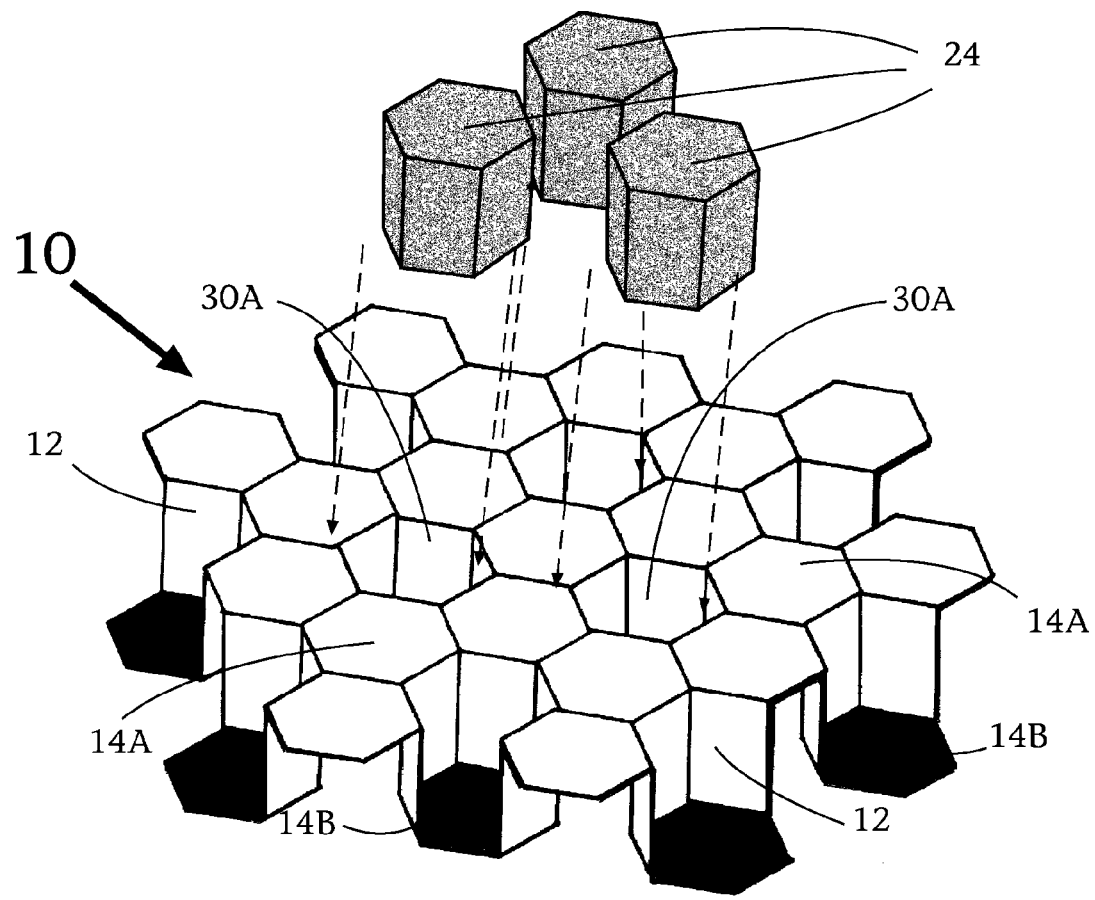
FIG. 7 is a diagrammatic view of one surface of the flat, un-flexed core element of the present invention, fully folded, with hexagonal inserts disposed for insertion into the voids defined by hexagonal nodes forming the first surface.
Figure 8:
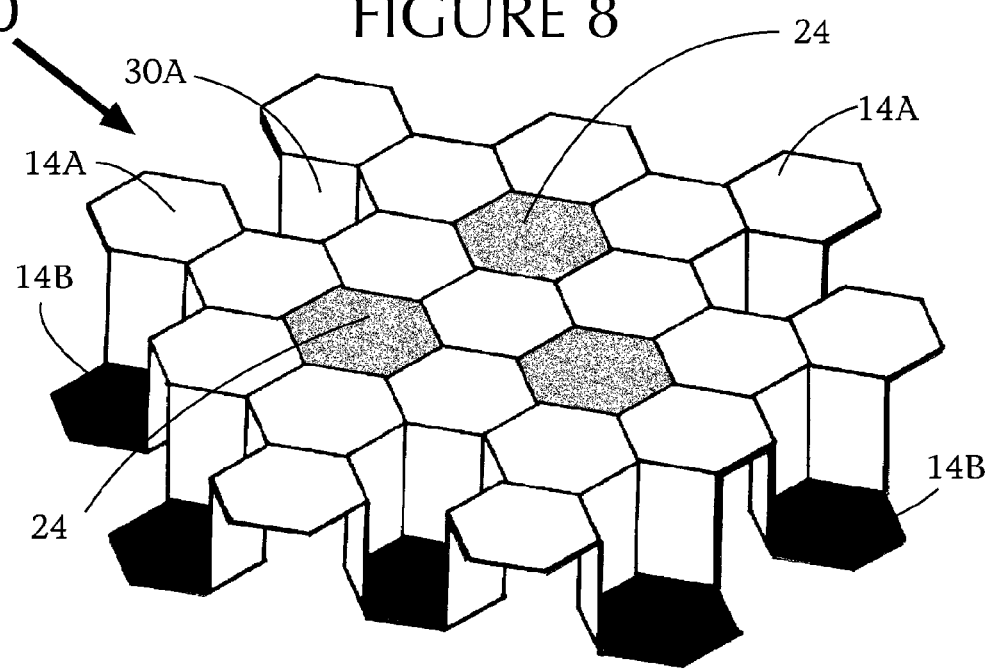
FIG. 8 is a perspective view of the core element of the present invention in which hexagonal inserts have been inserted into the voids defined by hexagonal nodes forming the first surface.

FIGS. 7 and 8 illustrate the use of hexagonal inserts to further increase the strength and durability of core element 10. In FIG. 7, a plurality of hexagonal inserts 24 are disposed for insertion into open cells 30A formed by wall members 12 and second surface hexagonal nodes 14B. FIG. 8 shows the inserts 24 after having been inserted into cells 30A. The bottom of inserts 24 sit atop the underside of second surface nodes 14B. Inserts 24 may be solid or foam metal, or any variety of material having physical characteristics suitable for the given application. Inserts 24 can be bonded within cells 30A to further increase the compression and shear strength of the resulting lightweight sandwich panel, without loss of panel venting.

An alternative embodiment of the present invention, not illustrated, is to bond hexagonal inserts 24 into open cells 30A that open from the first surface of element 10 as well into open cells 30B that open from the second surface of core element 10, in order to further increase the compression and shear strength and bonding area of element 10 in the context of lightweight sandwich panel construction, albeit with a total loss of panel venting.

A further embodiment is to bond hexagonal inserts 24 into all of the open cells 30A accessible from the first surface and some but not all of the open cells 30B accessible from the second surface of core element 10 in order to balance the need for additional compression and shear strength with the need for venting, with a partial loss of panel venting.

A further application of the core element 10 of the present invention is as flexible body armor. According to this embodiment (not shown), the core element is formed from a flat sheet of flexible material. Solid metal or ceramic hexagonal inserts 24 (as shown in FIGS. 7 and 8) are bonded into the open cells 30A and 30B along the first surface and second surfaces of element 10. A scrim cloth material is attached to each surface of core element 10 to maintain element 10 in a folded configuration.

Figure 9:
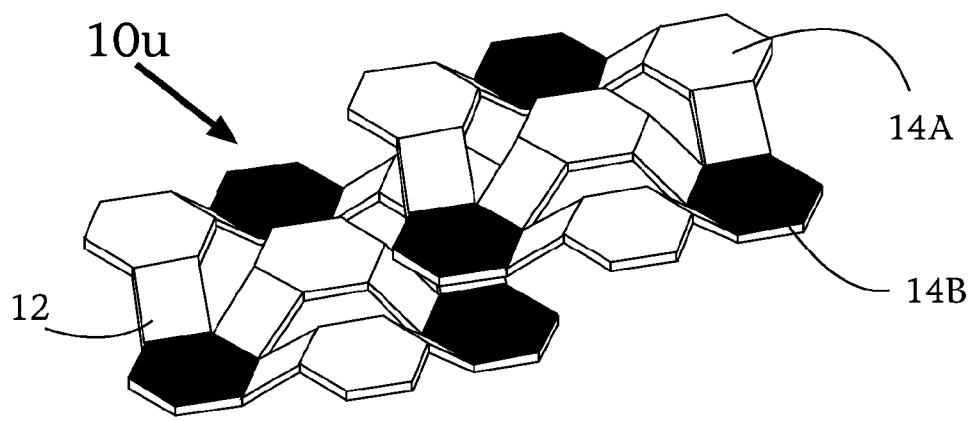
FIG. 9 is a diagrammatic view of two enlarged sub-units of the core element of the present invention, layered and conjoined at their respective edges
Figure 10:
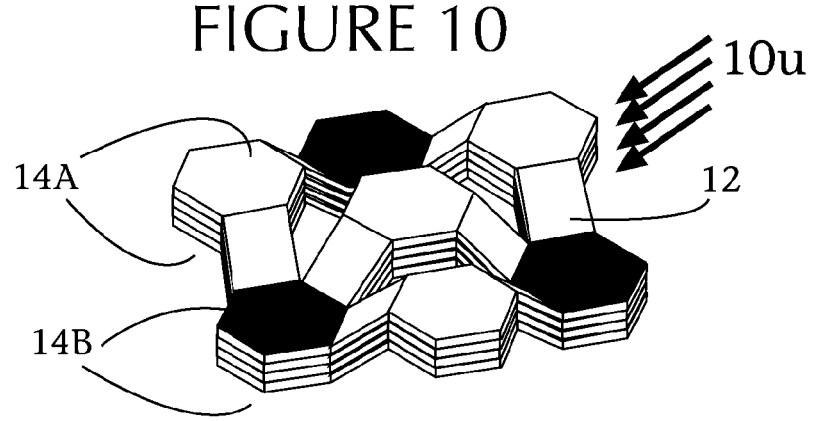
FIG. 10 is a perspective view of a stack of sub-units of the core element of the present invention nestled one atop the other.

FIGS. 9 and 10 depict partially folded sub-units 10u of core element 10 illustrating how core element 10 may be layered, conjoined and nestled into stacks. First surface hexagonal nodes 14A are separated from second surface hexagonal nodes 14B by wall members 12. A plurality of core elements 10 may be layered, or nested, one on the other, by positioning first surface nodes 14A of a first core element 10 on top of first surface nodes 14A of a second core element 10, with second surface nodes 14B of the first core element 10 laying on top of second surface nodes 14B of the second core element 10, and wall members 12 of the first core element 10 laying on top of wall members 12 of the second core element 10; and doing likewise with additional core elements 10.

Figure 11:
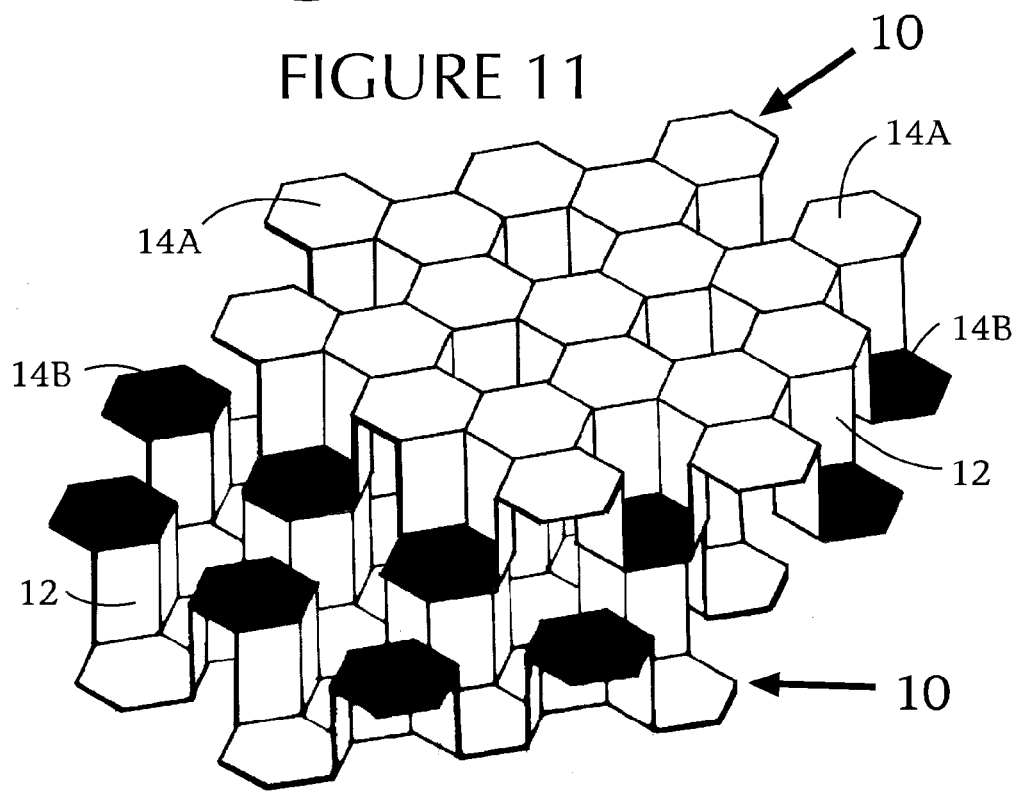
FIG. 11 is a perspective view of two layers of the core element of the present invention, one inverted relative to the other, overlapped for joining.

FIG. 11 illustrates another manner of layering and joining core elements 10 of the present invention, this time with one core element 10 inverted relative to the other. As shown in FIG. 11, lower core element 10 is oriented with second surface nodes 14B on top while the upper core element 10 is oriented with first surface nodes 14A on top. The two core elements 10 are overlaid by stacking and bonding hexagonal nodes 14B of the upper element 10 on top of hexagonal nodes 14B of the lower element 10.

Additional core element 10 layers can be bonded to the top or bottom of a core element 10, to provide multiple layers extending in any direction and to any extent. By overlaying, layering and nesting in the manners illustrated in FIGS. 9 through 11 and discussed above, one can join the edges of core elements 10 to increase the element's overall area, or layer core elements 10 to increase the strength and depth of the resulting core.

By way of example, core elements 10 can be layered in the manner shown in FIG. 11, and supplied with foam metal or similar inserts in the manner shown in FIGS. 7 and 8, to comprise an energy absorption device having varying levels of crush strength to suit the particular application.

Figure 12:
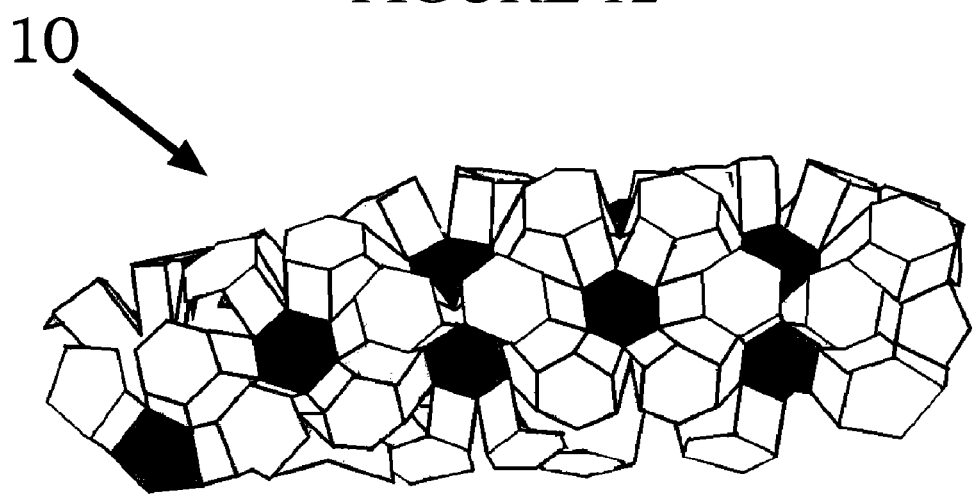
FIG. 12 is a perspective view of the core element of the present invention flexed into a tubular configuration according to a further embodiment of the present invention.

Illustrated in FIG. 12 is core element 10 of the present invention flexed into a tubular configuration for use as a flexible, tubular ducting. The ducting can also take on a sandwich type construction by bonding curved plates, or skins, to the first and second surfaces of the core element 10 shown in FIG. 12.

Figure 13:
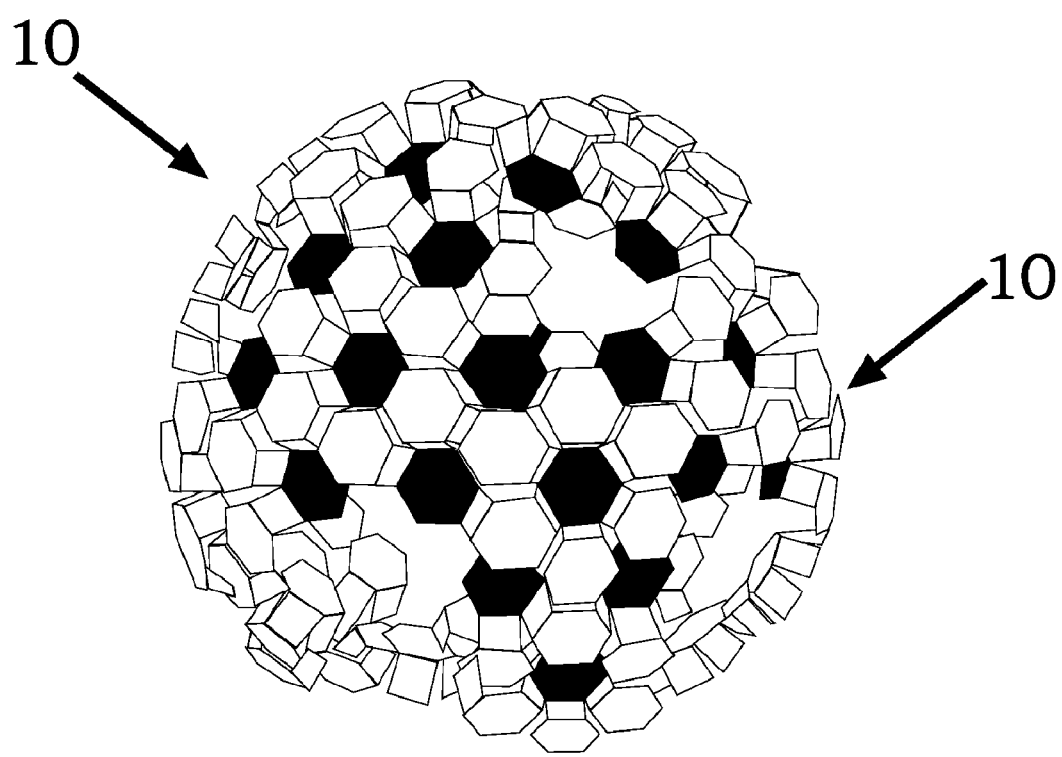
FIG. 13 is a perspective view of a spherical form comprising an array of the core elements of the present invention being edge connected.

FIG. 13 illustrates an array of core elements 10 conjoined at the edges and flexed into a sphere with hollow center, for use as a toy, ornament or teaching aid.

Another further embodiment of the present application, not shown, is to provide wall members 12 and hexagonal nodes 14 as disassembled components of an assembly kit suitable as a child's or adults' plaything, teaching aid, or display stand or ornament.

Core element 10, if fabricated from galvanized metal sheet for example, may be used as a concrete reinforcement in earthquake prone areas. A further application of core element 10 is as a soil stabilization mat with multiple layers as illustrated in FIGS. 10 and 11.

Method of Manufacture

A method of manufacture of core element 10 is illustrated through FIGS. 14 and 15A through 15C.

Figure 14:
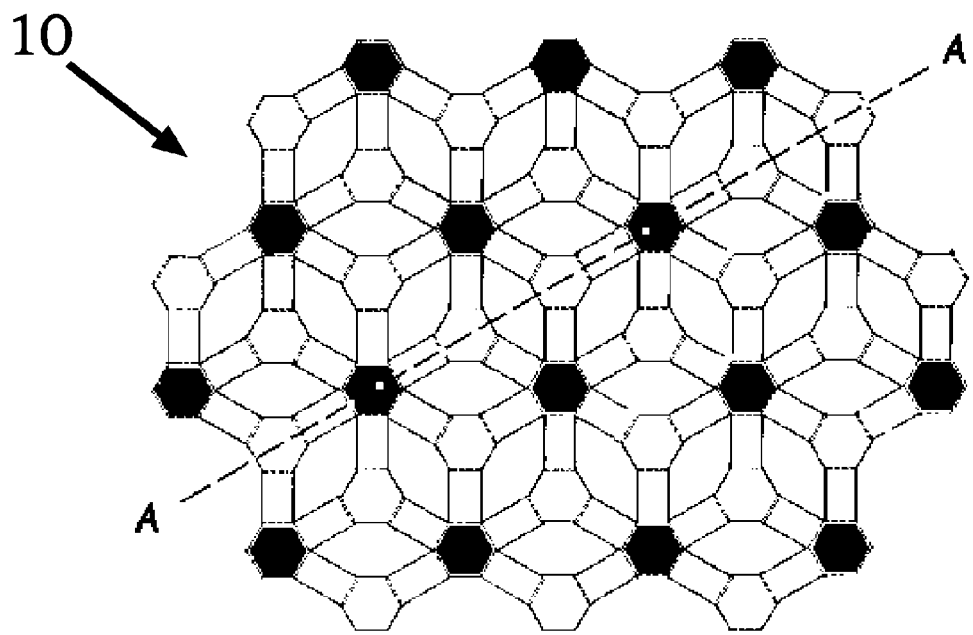
FIG. 14 is a plan view of the components of the flexible core element of the present invention illustrating the first step of the fabrication process.

The first step of core element 10 fabrication comprises feeding a continuous web of sheet material through a die punching unit (not shown) which cuts the repeating geometric pattern depicted in FIG. 14. The sheet material may be fibre reinforced plastic, aramid paper, carbon metallic foils such as aluminum, titanium and stainless steel, Kraft paper, or other material with suitable physical characteristics.

The first step may include, or may be followed as a subsequent step, the creasing of the die cut web along the lines where the sides of nodes 14A and 14B meet the edges of wall members 12.

Figure 15:
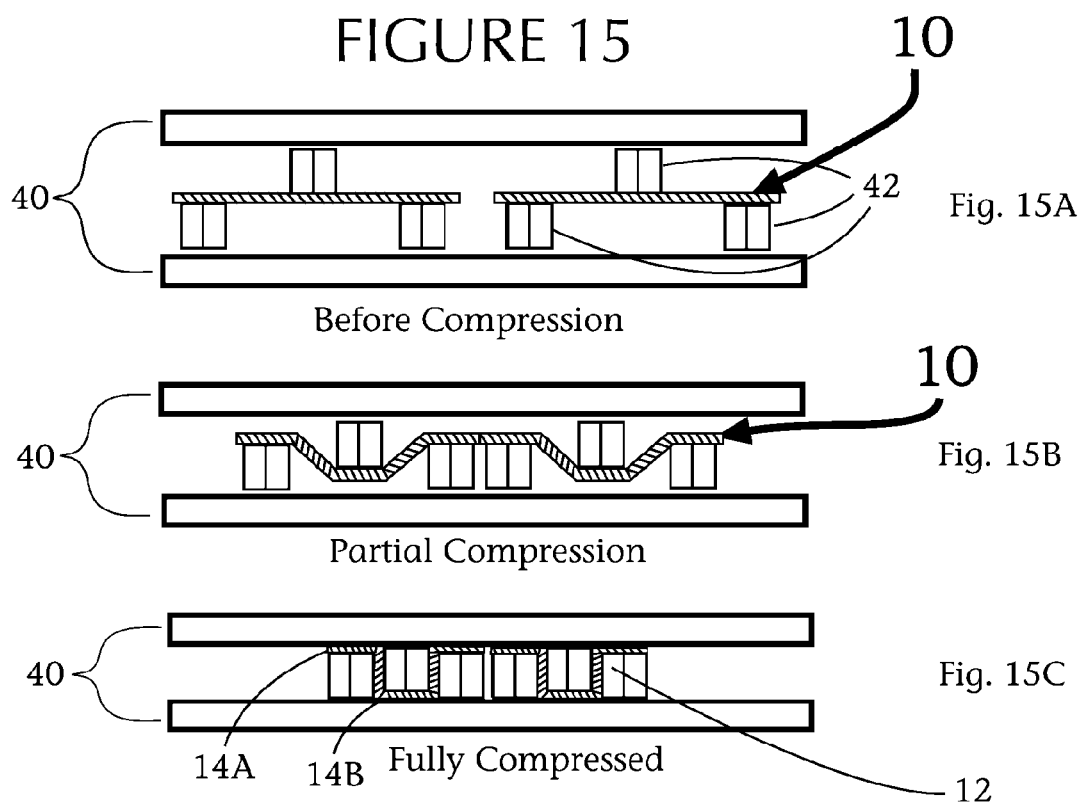
FIG. 15 is a cross-sectional view of the core element of the present invention taken along A-A in FIG. 14, illustrating subsequent stages of forming the core construction element.

The second step of the fabrication process involves feeding the die-punched web through a series of roller stations 40 as shown in FIG. 15 and progressively compressing (as shown in FIGS. 15A through 15C) core element 10 from both sides using a plurality of hexagonal dies 42 which register exactly with the moving web to form a series of alternating 90 degree folds across the ends of wall members 12 as shown in FIG. 15C. In the process, the web contracts by approximately half in both width and length whilst gaining in depth to form a flexible core element.

While this second step is illustrated and described in terms of a specific folding machine comprising roller stations 40 and hexagonal dies 42, other means and manner of folding, concertina style, core element 10 from a flat form to a compressed form, can be employed without departing from the scope, and spirit, of the instant invention.

In a further optional step, core element 10 is fed into a further unit (not shown) that attaches a flexible self-adhesive scrim to one side of the material prior to the material being cut into appropriate lengths. This optional step may instead include attaching a scrim to both surfaces of core element 10, or attaching the scrim first to one surface and then to the other.

When core element 10 is used for sandwich type construction, skins or facings, fabricated from a large variety of materials, are adhered to one or both surfaces of core element 10. Where additional depth is required, core element 10 can be layered after folding, and where additional strength is required, core element 10 can be stacked in the manner depicted in FIG. 11. Crush and shear strength can be enhanced through the bonding of inserts 24 as shown in FIGS. 7 and 8.

SUMMARY AND SCOPE

Accordingly, it will be readily appreciated that the core construction element of the present invention offers substantial advantages over prior art core materials and has great utility and applications.

Among the advantages of the core construction element of the present invention are its larger bonding area, open fast-venting core, lightweight construction, lateral strength, stackability and edge joining capability, one-piece construction and formability.

Because core element 10 is highly ventable while offering a large bonding surface area, it represents a superior choice for sandwich type construction because of its ability to resist delamination common to conventional core construction elements. The core element of the present invention exhibits good bend and shear strength in all transverse directions and may be reinforced, through the selected bonding of inserts, to increase crush strength.

Core element 10's flexibility and sub-unit structure renders it highly versatile and appropriate for a wide variety of applications. It can be flexed into tubular and spherical configurations, and can be extended and strengthened by layering and edge connecting.

Among the applications for core element 10 not described above are in the construction of solar energy reflection and collection panels; radio frequency shielding; sound attenuation panels; athletic shoes; double-skinned marine hulls; double skinned oil tanks; insulation curtains hazardous material removal; tent walls; double-skinned exhaust manifolds; motorcycle fairings; heat exchange panels; oil pipelines having an interstitial monitoring device with automatic alarms; roof paneling; and flexible fuel tank, to name but a few.

All of the features disclosed in this specification and/or all of the steps of the method of manufacture disclosed may be combined in any combination, except combinations where at least some of such features and/or steps are mutually exclusive. Alternative features and steps serving the same, equivalent or similar purpose may replace each feature and step disclosed in this specification, unless expressly stated otherwise. Thus, unless expressly stated otherwise, each feature disclosed is one example only of a generic series of equivalent or similar features.

While the present invention has been described in terms of specific structures and steps the invention is not limited to these structures and steps. Additional and alternative structures and steps may be employed without departing from the spirit or scope of the present invention and are contemplated to be part and parcel of what is claimed herein.

Accordingly, the scope of the invention should be determined by the appended claims and their legal equivalents, rather than with reference to any particular example, embodiment or illustration.

What is claimed is:

1. A core element suitable for sandwich construction comprising
    a plurality of first planar hexagonal nodes defining a first surface of said core element;
    a plurality of second planar hexagonal nodes of identical dimension to said first hexagonal nodes, defining the obverse surface of said core element spaced apart from and parallel to said first surface;
    planar rectangular wall elements defining the depth of said core element and connecting every other side of said first hexagonal nodes to every side of said second hexagonal nodes;
    wherein said first surface demonstrates twice the number of hexagonal nodes compared with said obverse surface.

2. A core element suitable for sandwich construction comprising
    a plurality of first planar hexagonal nodes defining a first surface of said core element;
    a plurality of second planar hexagonal nodes of identical dimension to said first hexagonal nodes, defining the obverse surface of said core element spaced apart from and parallel to said first surface;
    planar rectangular wall elements defining the depth of said core element connecting every other side of said first hexagonal nodes to every side of said second hexagonal nodes;
    wherein said first surface demonstrates twice the number of hexagonal nodes compared with said obverse surface, each hexagonal node corresponds to an open cell on the opposing surface and each hexagonal node is available as a bonding surface.

3. The core element of claim 1, further comprising a first skin adhered to said first surface and a second skin adhered to said second surface to form a sandwich structure.

4. The core element of claim 2, wherein hexagonal inserts are disposed into the cells formed between the first hexagonal nodes.

5. The core element of claim 2, wherein hexagonal inserts are disposed into the cells formed between the first and second hexagonal nodes.

6. The core element of claim 2, wherein hexagonal inserts are disposed into some of the cells formed between the first and/or second hexagonal nodes.

7. The core element of claim 4, 5, or 6, wherein said hexagonal inserts are fabricated from foam metal.

8. The core element of claim 1 wherein said element is flexed to form a concave and opposite convex surface.

9. The core element of claim 8 further comprising a first and second Curved skin adhered to the concave and convex surfaces of said core element.

10. The core element of claim 2 wherein a plurality of elements are joined by nesting the second hexagonal nodes of one core element within the open cells formed by the first hexagonal nodes of a second core element.

11. The core element of claim 2 wherein a plurality of elements are joined by inverting one core element relative to the adjacent core element and bonding the hexagonal nodes of one element to the hexagonal nodes of the adjacent element.

12. The core element of claim 2 wherein said element is flexed and twisted into a tubular formation such that the edges of said core element overlap and are joined by nestling and bonding the second hexagonal nodes of one edge of said core element within the open cells formed by the hexagonal nodes of the opposite edge of said core element.

13. The core element of claim 2 further comprising an array of said elements connected, one to the other, in the manner described in claim 11 to form a spheroid.

14. The spherical core away of claim 13, further comprising an outer and inner skin adhered to the first and second surface of said array.

15. A method for the manufacture of a core element suitable for sandwich construction, comprising the steps of:
    (1) cutting a continuous web of sheet material into the repeating geometric array comprising first and second surface hexagonal nodes of identical dimension interconnected by a plurality of rectangular wall members of identical dimension such that every node is surrounded by six other nodes and such that every other side of said first surface hexagonal nodes are connected by said wall member to every side of the adjacent second surface hexagonal node;
    (2) creasing said web along the lines where the ends of said wall members join the sides of said hexagonal nodes; and
    (3) folding said web, concertina style, to form a series of alternating 90 degree folds across the ends of said wall members where said wall members meet the side of said nodes to form a core element having opposing parallel planar surfaces comprised of hexagonal nodes and a depth defined by said wall members, wherein one surface demonstrates twice the number of hexagonal nodes compared with the obverse surface and wherein each hexagonal node is available as a bonding surface.

16. The method of claim 15 wherein steps two and three are achieved by feeding said die-punched web through a series of roller stations and progressively compressing said web from both sides using a plurality of hexagonal dies which register exactly with the moving web.

17. The method of claim 15, comprising the further steps of attaching a flexible self-adhesive scrim to one or both surfaces of said folded core element and cutting said element into appropriate lengths.

18. The method of claim 15, comprising the further step of adhering facings to one or both surfaces of said folded core element to form a sandwich style construction panel.

19. The method of claim 15, further comprising the steps of extending the total area of said core element by overlapping and bonding the edges of the core elements one to another.

20. The method of claim 15, further comprising the steps of strengthening said core element by stacking the core elements one on top of another.

21. The method of claim 15, further comprising the steps of twisting said core element into a tubular formation and joining the edges thereof.

* * * * *